UNITED STATES PATENT OFFICE

2,646,419

AMINOALKANE SULFURIC ACID MODIFIED UREA - FORMALDEHYDE RESINS AND PROCESS OF PREPARING SAME

Tzeng Jiueq Suen, Stamford, Conn., and Arthur M. Schiller, Astoria, N. Y., assignors to American Cyanamid Company, New York, N. Y., a corporation of Maine No Drawing. Application November 2, 1949, Serial No. 125,152

12 Claims. (Cl. 260—70)

This invention relates to water soluble urea-formaldehyde resins modified with an organic aminosulfuric acid compound and the process of preparing the same. This invention relates to water-soluble urea-formaldehyde resins modified by an amino-sulfuric acid compound having the formula: $NH_2(CH_2)_nOSO_3X$, wherein $n$ is a whole number between 1 and 6 inclusive, and X is a radical selected from hydrogen, potassium, sodium, lithium, $NH_4$, and hydrogen in combination with water soluble tertiary amines.

The object of the present invention is to prepare water soluble urea-formaldehyde resins modified by aminosulfuric acid compounds which are utilizable in the preparation of wet strength papers. A further object of the present invention is to produce water soluble urea resins which are utilizable in the treatment of leather and in the crease and shrink-proofing of textile materials. A further object of the present invention is to produce modified urea resins which are adaptable for use as adhesive materials. These and other objects will be discussed more fully in detail hereinbelow.

In the preparation of the urea resins of the instant invention, one may combine the urea and the formaldehyde under alkaline conditions, as the first stage of the reaction, subsequently adding the aminoalkylsulfuric acid and heating the reaction materials at reflux temperatures, thereafter cooling the reaction mixture under acid conditions and maintaining the mixture at lower temperatures until the viscosity of a 45% solids solution of the reaction mixture in water is at least B on the Gardner-Holdt scale at 25° C. and preferably within the range of F–J on that scale. The process may be modified in a number of ways. For instance, the three reacting components may be introduced into a suitable reaction chamber and heated at elevated temperatures within the range of about 70–90° C. under alkaline conditions, preferably at a pH of about 8–9 for a period of about 15–20 minutes. The reaction mixture may then be heated at reflux temperatures for a period of 15–300 minutes and the pH of the reaction system at this temperature is not critical and need not be controlled on the alkaline or the acid side. The pH of the reaction mixture may then be adjusted to about 1–5 but preferably 2–4 for a period of time sufficient to permit the reaction mixture to reach a viscosity of at least B on the Gardner-Holdt scale when the viscosity test is applied to a 45% solids solution of the resin in water. This viscosity increase may be effected either by continued heating or cooling but preferably by cooling to a temperature of 25° C.–60° C. These and other modifications of the reaction process will be obvious to those skilled in the art, and it is intended that each of these modifications be included within the scope of the claims set forth hereinbelow:

In order that the invention be more completely understood, the following detailed examples are set forth for the purpose of illustration only and are not to be interpreted as a limitation on the case except as indicated by the appended claims. All parts are parts by weight. pH determinations are by glass electrode.

EXAMPLE 1

60 parts of urea (1 mol), 178 parts of a 37% aqueous solution of formaldehyde (2.2 mols), and 0.66 part of 10% sodium hydroxide solution are introduced into a suitable reaction chamber to form a mixture with a pH of 9.5. The mixture is heated to a temperature of 70–80° C. and maintained at 70–80° C. for a 30-minute period, thereupon 8.4 parts (0.06 mols) of 2-aminoethylsulfuric acid dissolved in 13.8 parts of a 10% sodium hydroxide solution and 10 parts of water are introduced into the reaction system. The pH is then adjusted to about 2 with 10% hydrochloric acid and the reaction mixture is refluxed for 60 minutes. During the refluxing, the pH of the solution is adjusted to about 2.2 by the addition of 10% sodium hydroxide. The reaction mixture is then cooled to a temperature of about 40–45° C. and maintained at that temperature until the viscosity at 25° C. of a 45% solids solution of the reaction mixture in water is between I and J on the Gardner-Holdt scale. The resinous solution is then neutralized with 10% sodium hydroxide.

When unbleached Kraft pulp is treated with 3% of the resin (on a solid basis) prepared according to the process set forth above, said percentage being based on the weight of the pulp, and cured for about 2 minutes at about 110° C. the resulting paper has a wet strength of 8 lbs. per inch.

EXAMPLE 2

60 parts of urea and 203 parts of a 37% aqueous solution of formaldehyde and 0.66 part of a 10% solution of sodium hydroxide are introduced into a suitable reaction chamber and heated for a period of about 30 minutes at a temperature of about 70–80° C. The pH of the reaction mixture prior to the beginning of the exothermic reaction was about 9.4. Thereupon, 8.5 parts of 2-aminoethylsulfuric acid dissolved in 18.7 parts of a 10% aqueous solution of sodium hydroxide and 10 parts of water are then introduced and the pH of the reaction mixture is 5.6. The solution is heated at reflux temperature for approximately 1 hour at which time the pH has dropped down to about 2.5. The reaction mixture is then cooled to about 25° C. and its pH adjusted to 2.1 with 10% hydrochloric acid and permitted to remain at 25° C. for about 75 minutes. A 45% solids solution of the resin has a viscosity at 25° C. of about H on the Gardner-Holdt scale.

EXAMPLE 3

60 parts of urea, 186 parts of a 37% aqueous formaldehyde solution, and 0.66 part of a 10% aqueous solution of sodium hydroxide are introduced into a suitable reaction chamber. The pH of the mixture is 9.4. The reaction mixture is heated to 70–80° C. for a 30 minute period. 8.5 parts of 2-aminoethylsulfuric acid dissolved in 18.7 parts of 10% sodium hydroxide solution and 10 parts of water are then introduced into the reaction mixture and the pH initially is about 5.7. The reaction mixture is heated to reflux (about 96° C.) for a 60 minute period during which time the pH drops to about 2.5. The reaction mixture is then cooled to 45° C. and maintained at that temperature for about 25 minutes, whereupon the final viscosity at 25° C. of a 45% solids solution of the resin is about D on the Gardner-Holdt scale. The pH of the resin syrup is then neutralized.

EXAMPLE 4

60 parts of urea, 162 parts of a 37% aqueous formaldehyde solution and 0.66 parts of a 10% sodium hydroxide solution are introduced into a suitable reaction chamber to form a mixture with a pH at 9.6. The mixture is heated to and maintained for 30 minutes at a temperature of about 70–80° C. 8.5 parts of 2-aminoethylsulfuric acid dissolved in 19.8 parts of a 10% sodium hydroxide solution and 10 parts of water are then introduced into the system. The pH is adjusted to 5.9 and the mixture is heated to reflux (97° C.) for a 60 minute period. The final pH is about 2.6 and the mixture is cooled to a temperature of about 25° C. and maintained at that temperature for about 18 minutes. The viscosity at 25° C. of a 45% resin solids solution in water is about H on the Gardner-Holdt scale. It is then neutralized with dilute sodium hydroxide.

EXAMPLE 5

60 parts of urea (1 mol) and 178 parts of a 37% aqueous formaldehyde solution are introduced into a suitable reaction chamber and the pH of the mixture is adjusted to about 9.5 by the addition of 0.66 part of a 10% sodium hydroxide solution. The mixture is then heated to 70–80° C. for a 30 minute period. 4.25 parts (0.03 mol) of 2-aminoethylsulfuric acid dissolved in 9.4 parts of a 10% aqueous solution of sodium hydroxide and 5 parts of water are then introduced into the reaction system. The pH is about 5.6. The reaction mixture is then heated at reflux temperature (96° C.) for approximately 60 minutes. The pH drops to about 2.5. The mixture is then cooled to a temperature at 40–45° C. and is maintained at that temperature for a period of about 11 minutes. It is then neutralized. The final viscosity at 25° C. of a 45% solids solution is about F–G on the Gardner-Holdt scale.

EXAMPLE 6

60 parts of urea and 178 parts of a 37% aqueous formaldehyde solution are introduced into a suitable reaction chamber and the pH of the mix is adjusted to 9.6 by the addition of 0.66 part of a 10% sodium hydroxide solution. The mixture is then heated for a 30 minute period at a temperature of 70°–80° C. 12.8 parts of 2-aminoethylsulfuric acid (0.99 mol) dissolved in 25.5 parts of a 10% sodium hydroxide aqueous solution and 10 parts of water are then introduced into the reaction mixture. The pH is about 5.8. The mixture is heated at reflux temperature (97° C.) for about 60 minutes. The pH drops to about 2.5. While keeping the pH at this level, the reaction mixture is cooled to and maintained at about 50° C. for about 53 minutes. It is then neutralized. The final viscosity of a 45% solids resin solution at 25° C. is about F on the Gardner-Holdt scale.

EXAMPLE 7

60 parts of urea and 178 parts of a 37% aqueous formaldehyde solution are introduced into a suitable reaction vessel and the pH of the mixture is adjusted to about 9.6 by the addition of 0.66 parts of a 10% sodium hydroxide solution. The mixture is then allowed to react at a temperature of about 70°–80° C. for a 30 minute period. Thereupon, 17 parts of 2-aminoethylsulfuric acid (0.12 mol) dissolved in 25 parts of a 10% sodium hydroxide solution and 10 parts of water are introduced into the reaction mixture. The pH is about 5.2. The mixture is heated at reflux temperature (95° C.) for about 60 minutes. At the end of refluxing the pH of the mixture is 2.2. The mixture is then cooled to 50° C. and maintained at that temperature for 43 minutes. It is then neutralized with 15 parts of a 10% sodium hydroxide solution. The final viscosity of the resin is H on the Gardner-Holdt scale.

EXAMPLE 8

180 parts of urea (3 mols), 511 parts of a 37% aqueous formaldehyde solution (6.3 mols), 6 parts of triethanolamine, and a solution of 17 parts of 2-aminoethylsulfuric acid (0.12 mol) and 60 parts of water are mixed together in a suitable reaction chamber. The pH is measured at 8.3 (glass electrode). The solution is heated to reflux and maintained at that temperature for approximately 30 minutes. The pH is then lowered to 3.9 by the addition of about 10.5 parts of a 10% hydrochloric acid solution. The reaction mixture is again refluxed for about 30 minutes. The pH drops to 3.7. The solution is cooled to 60° C. and maintained at 57–60° C. for about 20 minutes. It is then neutralized with a 10% sodium hydroxide solution. The viscosity of a 45% resin solids solution at 25° C. is between G and H on the Gardner-Holdt scale. The resin solids content is 45% solids.

EXAMPLE 9

240 parts of urea (4 mols) is dissolved in 648 parts of a 37% aqueous solution of formaldehyde (8 mols) and the pH is adjusted to 8.7 with triethanolamine. The reaction mixture is heated to reflux temperature and maintained at reflux for approximately 30 minutes. The reaction mixture is then cooled to 80° C. and a solution of 17 parts of 2-aminoethylsulfuric acid in 38 parts of a 10% caustic solution and 20 parts of water is added. The pH is then adjusted to 6.3 with 18% hydrochloric acid. The reaction mixture is brought to reflux again and maintained at that temperature for an additional 30 minutes. The pH is then readjusted to 3.9 with an 18% hydrochloric acid solution and the reaction mixture is then refluxed for an additional 15 minutes. The pH of the reaction mixture is then adjusted to about 7.5 with a 10% caustic solution and cooled. The viscosity of the resin syrup containing 45% solids is about F on the Gardner-Holdt scale.

It will be obvious from the above examples that the process is preferably carried out in three stages, namely, the first stage in which the urea and formaldehyde are permitted to coreact under alkaline conditions by heating to a temperature of about 70–80° C. for a 30 minute period thereupon the aminoalkylsulfuric acid dissolved in dilute alkali solution is added and the mixture refluxed for about 1 hour. This second phase is, as a rule, conducted under acid conditions and is generally referred to as the acid stage because the pH is controlled within the limits of 1 to 5 and preferably between 2 and 5. The third stage is the aging or thickening stage which must be conducted under acid conditions and preferably within the pH range of 2 to 4 and is accomplished by cooling the reaction mixture at a temperature varying between 25 and 50° C. for a period of time sufficient to give the desired viscosity of the resin solution. The time factor during this third stage is of no consequence, the important thing is that the viscosity be observed closely so that it is kept within the desired range.

The use of these resin solutions in the treatment of leather and textile materials such as in the water proofing of the latter and in the treatment of paper pulp in the manufacture of wet strength paper displays enhanced results over prior art resins. For optimum results, the viscosity at 25° C. of a 45% solids resin dispersion in water is at least B on the Gardner-Holdt scale and there is actually no upper limit to viscosity insofar as effectiveness of treatment is concerned but from the standpoint of stability, it is preferred that the viscosity, at 25° C. of the resin syrup, does not exceed J on the Gardner-Holdt scale when said viscosity measurement is determined on a 45% resin solids solution in water. Resin solutions having a viscosity greater than J (same solids content) are just as effectively utilizable for the purpose but the tendency toward gelation during long time storage increases rather markedly with increased viscosity without any appreciable increase in effectiveness, particularly in the manufacture of wet strength paper. As a consequence, it is desired for practical purposes to limit the viscosity to the range of B–J on the Gardner-Holdt scale (same solids basis) as above.

It has been set forth hereinabove that the modifier for the urea-formaldehyde resin should be an aminosulfuric acid or derivative thereof having the formula: $NH_2(CH_2)_nOSO_3X$, wherein the letter $n$ signifies a whole number between 1 and 6, inclusive, and X designates a radical selected from the group consisting of H, Na, K, Li, $NH_4$, and hydrogen in combination with water soluble tertiary amines, such as triethylamine, trimethylamine, triethanol-amine, and the like. Amongst that group are such compounds as aminomethylsulfuric acid, 2-aminoethylsulfuric acid, 3-aminopropylsulfuric acid, 4-aminobutyl acid, 5-aminoamylsulfuric acid, and 6-aminohexylsulfuric acid and the salts thereof. It is preferred that the amino group and the sulfuric acid or salt group be attached to the two end carbon atoms. The proportions of the aminosulfuric acid which may be used in the practice of the process of this invention may be varied within the limits of 0.015–0.25 mol of aminosulfuric acid per mol of urea but it is preferred that the mol ratio be within the limits of 0.03–0.12 mol of aminosulfuric acid per mol of urea.

The molar proportions of formaldehyde to urea in the preparation to urea in the preparation of the resins of the instant invention may be varied within the limits of 1.5:1 to 3:1 but it is preferred that those resins which have mol ratios of 1.8:1 to 2.5:1 be used.

If it is desired to introduce the three reacting components initially into the reaction chamber in the range of proportions set forth hereinabove one may adjust the pH of the mixture to the alkaline side and preferably within the range of 8–9. The mixture may be heated for a period of from 15 to 120 minutes at a temperature varying between 70–90° C. The subsequent heating at reflux temperatures may be accomplished in a period of 15 to 300 minutes and the pH of the reaction mixture, during this phase of reaction, is not critical and may be on either the acid or alkaline side. In the aging or thickening stage, however, the pH must be controlled within the range of 1 to 6 and preferably within the range of 1 to 5, with the range 2 to 4 producing optimum results. The temperature to which the reaction mixture must be cooled is within the range of 25–50° C. and it is within this range that the reaction temperature be maintained until the desired viscosity is reached.

Hand sheets were prepared on the Nash sheet machine according to a conventional process in which unbleached Canadian kraft pulp was used throughout with about 3% alum and 3% resin (on solids basis) said percentages being based on the weight of fiber. The results produced are set forth in the table hereinbelow.

*Table*

EVALUATION OF UF-2-AMINOETHYLSULFURIC ACID RESINS

| Type Resin | Molar Ratio U//A | Gardner-Holdt Viscosity | Resin Retained, Percent on Fiber | Basis Weight, 25×40/500 | Tensile Str. Cure,[1] Dry | Regular, Wet | lbs./in. Extra Cure[2] | |
|---|---|---|---|---|---|---|---|---|
| | | | | | | | Dry | Wet |
| UF 2-Aminoethylsulfuric Acid | 1/2.2/0.06 | I-J | 1.41 | 47.4 | 31.4 | 8.0 | 32.2 | 9.4 |
| Do | 1/2.2/0.06 | I-J | 1.50 | 43.5 | 30.8 | 7.8 | 31.4 | 9.0 |
| Do | 1/2.5/0.06 | H | 1.30 | 45.1 | 31.4 | 7.6 | 30.6 | 9.2 |
| Do | 1/2.3/0.06 | I | 1.39 | 45.7 | 32.8 | 7.6 | 32.4 | 9.2 |
| Do | 1/2.0/0.06 | H | 1.35 | 45.4 | 29.8 | 6.6 | 31.2 | 8.2 |
| Do | 1/2.2/0.03 | G | 1.38 | 45.5 | 31.2 | 7.2 | 32.0 | 8.6 |
| Do | 1/2.2/0.09 | F | 1.33 | 45.3 | 30.6 | 6.8 | 30.6 | 8.2 |
| Do | 1/2.2/0.12 | H | 1.26 | 45.8 | 32.0 | 7.0 | 31.2 | 8.4 |

[1] Regular cure—heated at 105–110° C. for 2 minutes.
[2] Extra cure—regular cure and heated at 260° F. for 10 minutes.

I claim:

1. A process for preparing a water soluble urea-formaldehyde resin comprising reacting at elevated temperatures under alkaline conditions urea, formaldehyde and a compound having the general formula: $NH_2(CH_2)_nOSO_3X$, wherein $n$ is a whole number between 1 and 6 inclusive, and X is a member of the group consisting of H, Li, K, Na, $NH_4$, and hydrogen in combination with a water soluble tertiary amine and wherein the mol ratios are 1:1.5:0.015 to 1:3:0.25, respectively, and then reacting the mixture under acid conditions until a viscosity of 45% solids solution in water is at least B on the Gardner-Holdt scale.

2. A process for preparing a water soluble urea-formaldehyde resin comprising reacting 1.5-3 mols of formaldehyde with 1 mol of urea under alkaline conditions, thereafter adding 0.015-0.25 mols per mol urea of a compound having the general formula $NH_2(CH_2)_nOSO_3X$ wherein $n$ is a whole number between 1 and 6 inclusive, and X is a member of the group consisting of H, Li, K, Na, $NH_4$ and hydrogen in combination with a water soluble tertiary amine, refluxing the reaction mixture, then reacting said mixture under acid conditions until a viscosity of a 45% solids solution in water is at least B on the Gardner-Holdt scale.

3. A process for preparing a water soluble urea-formaldehyde resin comprising reacting 1.8-2.5 mols of formaldehyde with 1 mol of urea under alkaline conditions, thereafter adding 0.03-0.12 mols of a compound having the general formula $NH_2(CH_2)_nOSO_3X$, wherein $n$ is a whole number between 1 and 6 inclusive, and X is a member of the group consisting of H, Li, K, Na, $NH_4$, and hydrogen in combination with a water soluble tertiary amine, refluxing the reaction mixture, then reacting said mixture under acid conditions until a viscosity of a 45% solids solution in water is at least B on the Gardner-Holdt scale.

4. A process for preparing a water soluble urea-formaldehyde resin comprising reacting 1.5-3 mols of formaldehyde per mol of urea at a pH of about 8-9 for 15-120 minutes at 70-90° C., adding thereto 0.015-0.25 mols per mol of urea, of a compound having the general formula $NH_2(CH_2)_nOSO_3X$, wherein $n$ is a whole number between 1 and 6 inclusive, and X is a member of the group consisting of H, Li, K, Na, $NH_4$, and hydrogen in combination with a water soluble tertiary amine, refluxing the reaction mixture for 15-300 minutes, reacting said mixture at a pH of 1-5 until the viscosity of a 45% solids solution in water is at least B on the Gardner-Holdt scale.

5. A composition of matter comprising a water soluble reaction product of urea, formaldehyde, and a compound having the general formula $NH_2(CH_2)_nOSO_3X$, wherein $n$ is a whole number between 1-6 inclusive, and X is a member of the group consisting of H, Li, K, Na, $NH_4$, and hydrogen in combination with a water soluble tertiary amine, and wherein the mol ratios of the individual components are between $$1:1.5:0.015-1:3:0.25$$

respectively.

6. A composition of matter comprising a water soluble reaction product of urea-formaldehyde and a compound having the general formula $NH_2(CH_2)_nOSO_3X$, wherein $n$ is a whole number between 1-6 inclusive, and X is a member of the group consisting of H, Li, K, Na, $NH_4$, and hydrogen in combination with a water soluble tertiary amine, and wherein the mol ratios of the individual components are between $$1:1.8:0.03-1:2.5:0.12$$

respectively.

7. A fibrous cellulosic material impregnated with the reaction product of claim 5.

8. A fibrous cellulosic material impregnated with the reaction product of claim 6.

9. A fibrous cellulosic material impregnated with 1%-10% of the reaction product of urea, formaldehyde, and a compound having the general formula $NH_2(CH_2)_nOSO_3X$, wherein $n$ is a whole number between 1-6 inclusive, and X is a member of the group consisting of H, Li, K, Na, $NH_4$, and hydrogen in combination with a water soluble tertiary amine, and the mol ratios of the individual components are between $$1:1.8:0.03-1:2.5:0.12$$

respectively.

10. A composition of matter comprising a water soluble reaction product of (1) an alkaline condensate of 1 mol of urea with between 1.5 and 3 mols of formaldehyde and (2) between 0.05 and 0.25 mols of the sodium salt of 2-amino ethyl sulfuric acid.

11. A composition of matter comprising a water soluble reaction product of (1) an alkaline condensate of 1 mol of urea with between 1.5 and 3 mols of formaldehyde and (2) between 0.05 and 0.25 mol of the potassium salt of 2-amino ethyl sulfuric acid.

12. A composition of matter comprising a water soluble reaction product of (1) an alkaline condensate of 1 mol of urea with between 1.5 and 3 mols of formaldehyde and (2) between 0.05 and 0.25 mol of the ammonium salt of 2-amino ethyl sulfuric acid.

TZENG JIUEQ SUEN.
ARTHUR M. SCHILLER.

References Cited in the file of this patent

UNITED STATES PATENTS

| Number | Name | Date |
|---|---|---|
| 2,389,416 | D'Alelio | Nov. 20, 1945 |

OTHER REFERENCES

Rollins Jour. Amer. Chem. Soc., Vol. 60, pages 2312-2314.